US007849008B1

(12) United States Patent
Ekker et al.

(10) Patent No.: US 7,849,008 B1
(45) Date of Patent: Dec. 7, 2010

(54) REAL-TIME CHARGE CALCULATION SYSTEM

(75) Inventors: Arnoud Ekker, Düsseldorf (DE); Olivier de Kerdrel, Düsseldorf (DE)

(73) Assignee: CGI Technologies and Solutions Inc., Fairfax, VA (US)

( * ) Notice: Subject to any disclaimer, the term of this patent is extended or adjusted under 35 U.S.C. 154(b) by 1450 days.

(21) Appl. No.: 09/353,625

(22) Filed: Jul. 15, 1999

(51) Int. Cl.
*G06Q 30/00* (2006.01)
(52) U.S. Cl. .............................. 705/40; 705/30; 705/32; 705/34; 379/111; 379/112; 379/114
(58) Field of Classification Search ................... 705/30, 705/32, 34, 40; 379/111, 112, 113, 114, 379/115, 126, 127; 707/101, 103, 104
See application file for complete search history.

(56) References Cited

U.S. PATENT DOCUMENTS

| 5,745,884 | A |   | 4/1998  | Carnegie et al. ............. 705/34 |
| 5,784,443 | A |   | 7/1998  | Chapman et al. ............ 379/119 |
| 5,850,520 | A | * | 12/1998 | Griebenow et al. ......... 709/206 |
| 5,852,812 | A |   | 12/1998 | Reeder ........................ 705/39 |
| 5,884,284 | A |   | 3/1999  | Peters et al. ................. 705/30 |
| 5,893,077 | A | * | 4/1999  | Griffin ......................... 705/34 |
| 6,014,641 | A | * | 1/2000  | Loeb et al. ..................... 705/1 |
| 6,058,170 | A | * | 5/2000  | Jagadish et al. ............. 379/114 |
| 6,078,907 | A | * | 6/2000  | Lamm ......................... 705/40 |
| 6,125,173 | A | * | 9/2000  | Jagadish et al. ............. 379/112 |
| 6,173,046 | B1 | * | 1/2001 | Jagadish et al. ............. 379/111 |
| 6,289,322 | B1 | * | 9/2001 | Kitchen ....................... 705/40 |
| 6,317,490 | B1 | * | 11/2001| Cameron et al. ............ 379/114 |
| 6,377,938 | B1 | * | 4/2002 | Block et al. ................... 705/32 |
| 6,421,652 | B2 | * | 7/2002 | Loeb et al. ..................... 705/1 |
| 6,434,537 | B1 | * | 8/2002 | Grimes ........................ 705/40 |
| 6,496,831 | B1 | * | 12/2002| Baulier et al. ............... 707/101 |

FOREIGN PATENT DOCUMENTS

| EP | 0491497 A1  | 6/1992  |
| EP | 0809387 A1  | 11/1997 |
| WO | WO 97/37503 | 10/1997 |
| WO | WO 99/30247 | 6/1999  |

OTHER PUBLICATIONS

ISA/EP—International Search Report for PCT/US99/16443 filed Jul. 26, 1999.
Written Opinion issued by PCT International Preliminary Examining Authority on Mar. 29, 2001.
International Preliminary Examination Report issued by PCT International Preliminary Examining Authority, mailed on Aug. 30, 2001.

* cited by examiner

*Primary Examiner*—Nga B. Nguyen
(74) *Attorney, Agent, or Firm*—Staas & Halsey LLP

(57) ABSTRACT

The above objects can be attained by a system that creates system-created events at an optimal time independent of the billing process, and performs a continuous pricing process so that as events become available to the system they can be priced and summarized in real-time, allowing the billing process to be performed more efficiently. Usage and one-time events become available for pricing as soon as they are delivered to the system. System-created events, such as recurring, minimum charge summary, and maximum charge summary events, are created by the system based on a schedule defined by a subscription to which a customer has subscribed. Charges for events are re-calculated, if necessary, when information in the system, which impacts the charge of an event, changes. On demand pricing is performed when a charge for summary event, such as, a tiered discount plan summary, minimum charge summary, or maximum charge summary, is to be displayed or billed.

33 Claims, 8 Drawing Sheets

REAL-TIME CHARGE CALCULATION SYSTEM

REFERENCE TO MICROFICHE APPENDIX

A microfiche appendix having 3 fiche and 220 frames is included herewith.

BACKGROUND OF THE INVENTION

1. Field of the Invention

The present invention is directed to a system that calculates prices for, and summarizes events in real time and, more particularly, to pricing events, including system created events, at an optimum time before a billing process is performed.

2. Description of the Related Art

The telecommunications industry has traditionally performed the pricing process during the billing process to ensure all charges appearing on a bill are priced correctly. Another process traditionally performed during the billing process is the process of creating system-created events, such as recurring charges. The time and expense (i.e., processing power) required to perform these processes is increasing because the telecommunications industry continues to expand, offering more complicated services, more combinations of services, and more pricing models, in addition to simply generating a growing number of events to be created, priced and billed. This results in a shrinking time window for the billing process to be completed.

Also, as competition increases in the telecommunications industry, customers (residential and business, alike) are demanding immediate access to, more accurate, and up-to-date information on charges that will appear on their next bill. With widely used tools such as the Internet, self-customer care, and on-line banking, these types of customer demands (on-demand requests) are likely to increase.

Traditional telecommunications billing systems are based on the approach that charges are only calculated for services that have been rendered, with the exception of recurring charges, which are typically billed in advance. This approach results in performing the pricing process at the latest possible moment, which is during the billing process.

What is needed is a system where system-created events are created independent of the billing process and charges for events are calculated real-time such that pricing is performed at the earliest reasonable and practical time. This offers both the telecommunications company and the customers of the telecommunications company the most immediate and accurate access to unbilled charges possible, as well as improves the billing process by reducing the computational demands of the billing process.

SUMMARY OF THE INVENTION

It is an object of the present invention to provide an architecture that supports the calculation of charges as the calculations can be performed rather than during the billing process.

It is another object of the present invention to provide a system that calculates charges for system-created events, such as recurring events, minimum charge summary, and maximum charge summary events at an optimal time prior to and independent of the billing process.

It is also an object of the present invention to recalculate, independent of the billing process, the charge for any event based on changes to information in the system that directly impact the event.

It is a further object of the present invention to price usage events as they become available.

It is an object of the present invention to perform summarization of charges in real-time.

It is another object of the present invention to provide on-demand pricing of summary records.

It is an additional object of the present invention to enable system-created events such as recurring, minimum charge summary, and maximum charge summary events to be created using a frequency (e.g., quarterly vs. monthly) independent of the billing process that bills the charges for those events.

It is a further object of the present invention to enable the charges for recurring, minimum charge summary, and maximum charge summary events to be applied towards discount plans in the same manner as usage and one-time events that are processed throughout the period.

The above objects can be attained by a system that creates system-created events independent of the billing process, and performs a continuous pricing process so that as events become available to the system they can be priced and summarized in real-time. Usage and one-time events are priced when they become available to the system. System-created events, such as recurring, minimum charge summary, and maximum charge summary events are created, and charges calculated, based on the schedule determined by a customer's subscriptions, independent of and outside the billing process and its frequency. One-time events are created, and charges calculated, once for the life of a subscription, typically the same day the subscription is activated or terminated. Summary events, such as minimum charge summary, maximum charge summary, and tiered, and tapered summaries, are created/updated by the system each time an event that impacts the summary is processed by the pricing process, i.e., real-time summarization. The present invention is implemented to price a summary event only when the summary event is to be displayed (for a CSR, customer, or on a bill), but the architecture of the present invention also supports pricing summary events each time the summary event is updated so that pricing activities for summary events are not required at display time, similar to usage, recurring, and one-time events.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
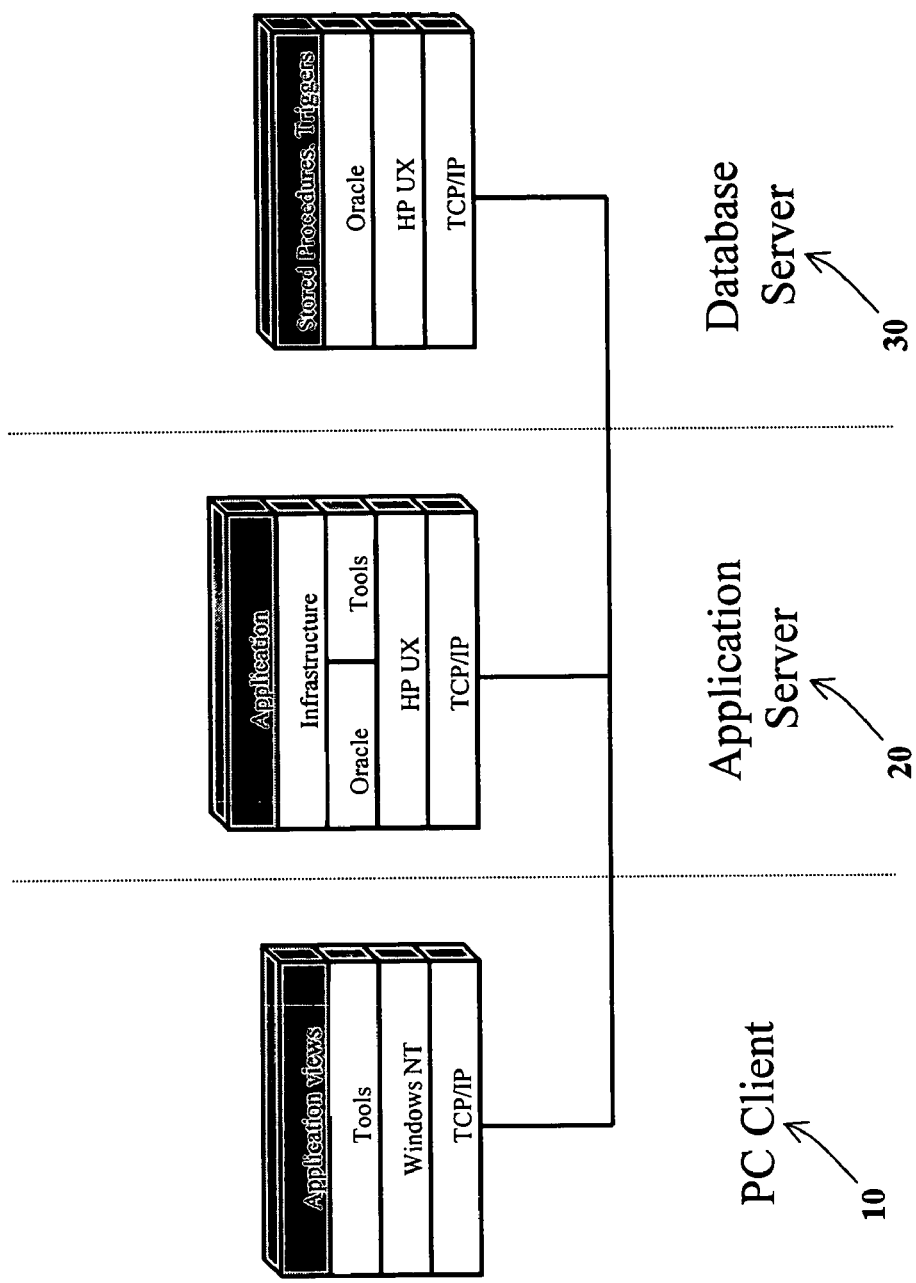
FIG. 1 depicts a preferred hardware and software architecture for the present invention.

Before discussing the invention in detail a summary of the terms used is provided. A billing period is a segment of time, defined by specific beginning and ending dates, used to help identify charges to be billed to a customer in a specific billing process. A billing process is a critical path, end-of-cycle process that organizes and formats all charges to appear on a specific physical or electronic invoice or bill. An event is a generic term used to identify a rendered, or a prediction of a rendered product or service. Summaries of events are also considered events. An event contains enough information for the system to be able to calculate a charge and bill the charge to the correct customer. A final price is the result of the final calculation of a charge for an event. An event that is final priced is ready for the billing process. A maximum charge summary event stores, in addition to summary totals, which can be zero, an amount charged a customer when the customer's total applicable charges for a given period exceed the maximum charge as specified by a price plan to which the customer has subscribed. An example is a $10,000 maximum charge that a medium-sized national retailer must pay for a toll free number. A minimum charge summary event stores, in addition to summary totals, which can be zero, an amount charged a customer when the customer's total applicable charges for a given period do not meet the minimum charge requirement as specified by a price plan to which the customer has subscribed. An example is a $100 minimum charge on an international calling plan where the customer can call any country in the world for $0.25/minute, but the customer is subject to a minimum usage charge of $100 per billing period. One-time events are delivered to the pricing process by the system that owns the subscriptions. One-time events result in charges that are billed and collected exactly one time. Examples of charges for one-time events are a service activation fee ($60 to activate a residential line) or the purchase of a hardware item ($175 charge for a new mobile phone). A price plan is a generic term used to describe the terms and conditions on which any given event is priced. A priceable event is an event that is available to the system, also has not been final priced, and for which pricing information, such as customer information and price plan information is known. Any event can be marked for re-processing, at which point it is again considered priceable. The pricing process accepts an event, identifies the price plan(s) that applies to the event, and calculates the price for the event. The pricing process can be performed as a part of, or independent of, the billing process. The term real-time is used in the present invention description in reference to when the system processes events (including summary events). As soon as an event is received, it is processed in real-time. In other words, events are not "batched up" and processed using a back-end process. Recurring event charges are system-created and result in charges that are billed on a regular, recurring interval. Examples of charges for recurring events are the fees charged for a discount plan ($3.95/month for the privilege of making unlimited long distance calls in the continental US or Canada for $0.10/minute anytime of day) or monthly access fees ($16.95/month for unlimited residential phone service). A subscription is a generic term used to describe a specific instance of a product or service provided to a customer, such as a mobile phone number or call waiting. The subscription references a price plan used to calculate charges for priceable events related to the subscribed product or service. A summary event is an accumulator for charges or some other metric, such as minutes, for events that are processed by the pricing plans. For the invention, the accumulators of summary events are used for calculating the final price of charges or discounts in real time. Maximum charge summary events and minimum charge summary events are system-created based on a schedule. All other summary events are created real-time as other events that contribute to the summary event are processed. Usage events are created by a network when a customer uses a metered service, such as making long distance calls, and then delivered to the system for pricing and billing. Charges for usage events are typically calculated based on a pre-determined metering algorithm.

The invention described herein includes a software architecture that supports several techniques used to maintain accurate up-to-date unbilled charge information for a telecommunications company and its customers. In the invention, charges for events are final priced as early as possible rather than waiting for the billing process to perform the pricing process to calculate final prices for charges. One significant advantage of calculating charges in real-time (final pricing as early as possible) is that the impact of the pricing process on the billing process is minimized or eliminated altogether, i.e., freeing the system from performing all or most of the pricing process during the billing process. Another major advantage of real-time charge calculation is that at any point in time, a customer service representative (CSR) or a customer may (on-demand) view all unbilled charges-to-date for a customer that will appear on the customer's next bill. Finally, a third significant advantage of finalizing charges prior to the billing process is that any and all charges can be considered for discount plans. Using the architecture and techniques described herein the charges-to-date will be as complete and accurate as possible at any point in time throughout the billing period.

In the telecommunications industry, there are three basic charge types. They are usage, one-time, and recurring. Usage charges are for metered services and are typically calculated based on a pre-determined metering algorithm. One-time charges are charges that are billed and collected exactly one time. Recurring charges are charges that are billed on a regular, recurring interval.

The present invention provides techniques that can be used to ensure all unbilled charges and discounts can be calculated real-time (i.e., as early as possible after an event is received in the system). The techniques used include:

Performing the pricing process continuously, independent of and outside the billing process so all events can be final priced/discounted as they become available to the system.

Creating and maintaining summary totals real-time within the pricing process as events impacting the summary totals are processed.

Creating recurring, minimum charge summary, and maximum charge summary events using a frequency (e.g., quarterly vs. monthly) independent of that of the billing processes that bill the charges for those events.

Re-calculating charges for events based on changes to information in the system that directly impact the events.

These techniques are described in detail below.

The present invention preferably operates in a hardware and software environment as depicted in FIG. 1. The environment is a three-tier client/server architecture. A user interface is implemented on the client 10 using MFC framework operating on Windows NT. There is also a client architecture (not shown) for allowing customer access over the Internet. The application server 20 component is implemented using C++ for the applications running on an HP-UX platform. The system uses an Oracle database system, also on an HP-UX platform, to store persistent objects on the database server 30. The client to server communication is based on Orbix. The system also includes storage, such as disk storage (not shown), in which the processes of the invention can be stored and distributed. The processes of the invention can also be distributed over a network, such as the Internet. The processes of the invention, such as the pricing process and the billing process, are stored and executed on the application server 20. Events that are received from a network (i.e., usage events) are stored on the database server 30 with events that are created by the system. The database server 30 also stores information, such as information on customers and their subscriptions. CSRs and customers make requests for viewing information via distributed procedures on the client 10 machines. These distributed procedures invoke processes on the application server 20 to service the requests. The processes of the present invention are discussed below and are described in more detail in the included Appendix.

Figure 6:
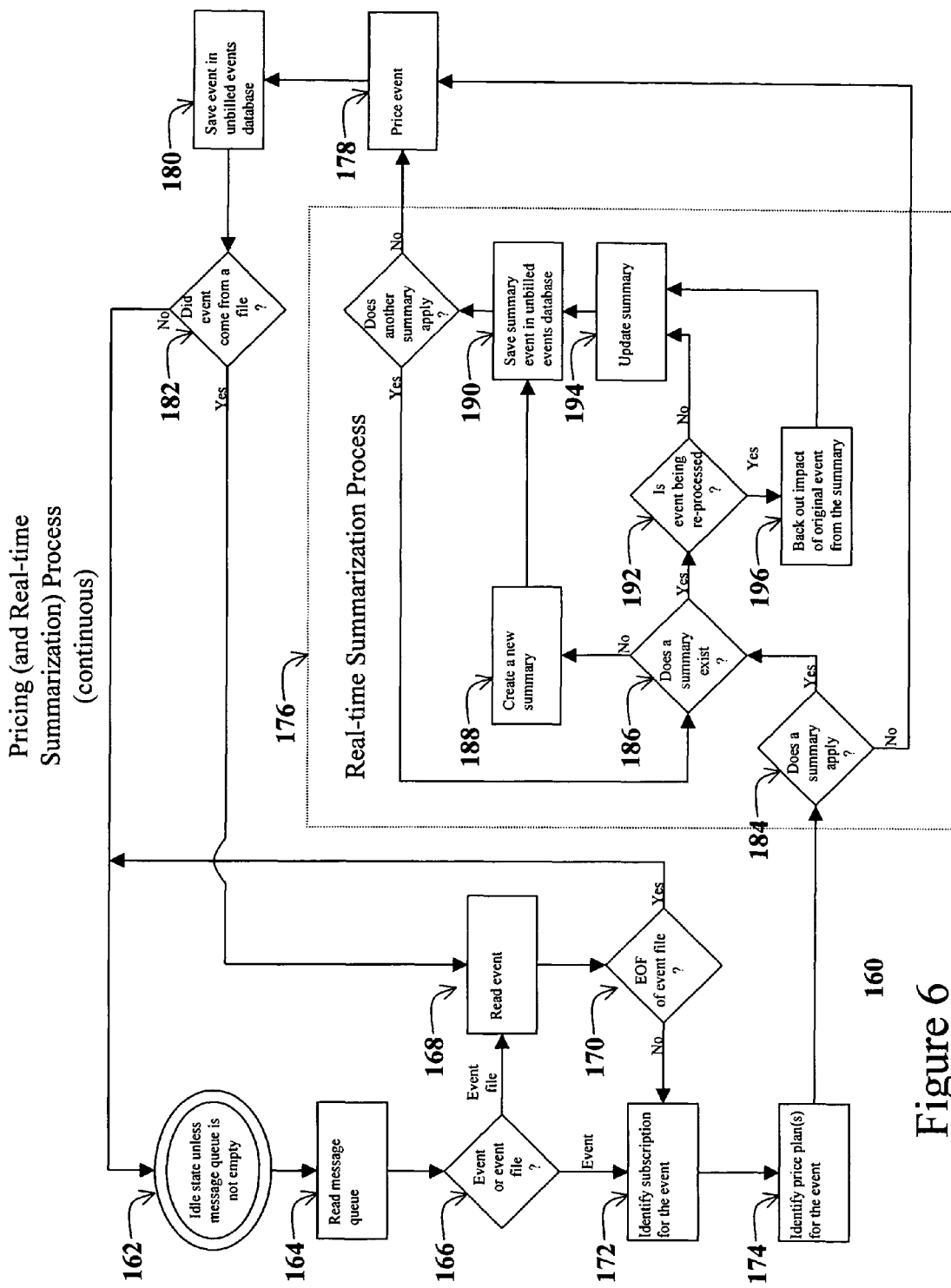
FIG. 6 is a block diagram of the pricing and real-time summarization processes performed by the present invention.

The present invention includes an architecture that allows a pricing process to be active and running continuously. FIG. 6, which will be discussed in more detail later, illustrates the basic pricing process flow. A pricing process is in an idle state, i.e., not consuming any hardware resources, unless it is processing events, so this architecture has no negative impact on the performance of other processes that may be running on the same physical machine. Events are delivered to a pricing process using a message queue. When an idle pricing process detects that a message exists in its queue, it immediately begins processing the message by reading it from the queue and processing the event(s) contained within the message. Upon completion of processing all the events in a message, the pricing process returns to an idle state unless there are subsequent messages in its queue, in which case the process repeats itself.

The physical architecture on which the pricing process runs is considered scalable, which means additional processors or machines can be added in order to support more pricing processes running simultaneously. If more than one pricing process is running, they are run in parallel, independent of each other. Such scalability is useful when the volume of messages and events to be processed exceeds the capacity of the current number of available pricing processes. Utilizing the scalability feature is an effective way to minimize the time any given event must wait before it is processed, which results in timely pricing of events and accurate up-to-date charge information.

The process and architecture described above for the pricing process provides a consistent, real-time means for calculating charges for events. Whether an event is a usage event received from the network, a recurring event created by the system, or an event that is tagged for re-processing as a result of a change to a subscription, it need only to be placed in the message queue of a pricing process and the event is priced and ready for billing (or viewing) immediately.

Figure 2:
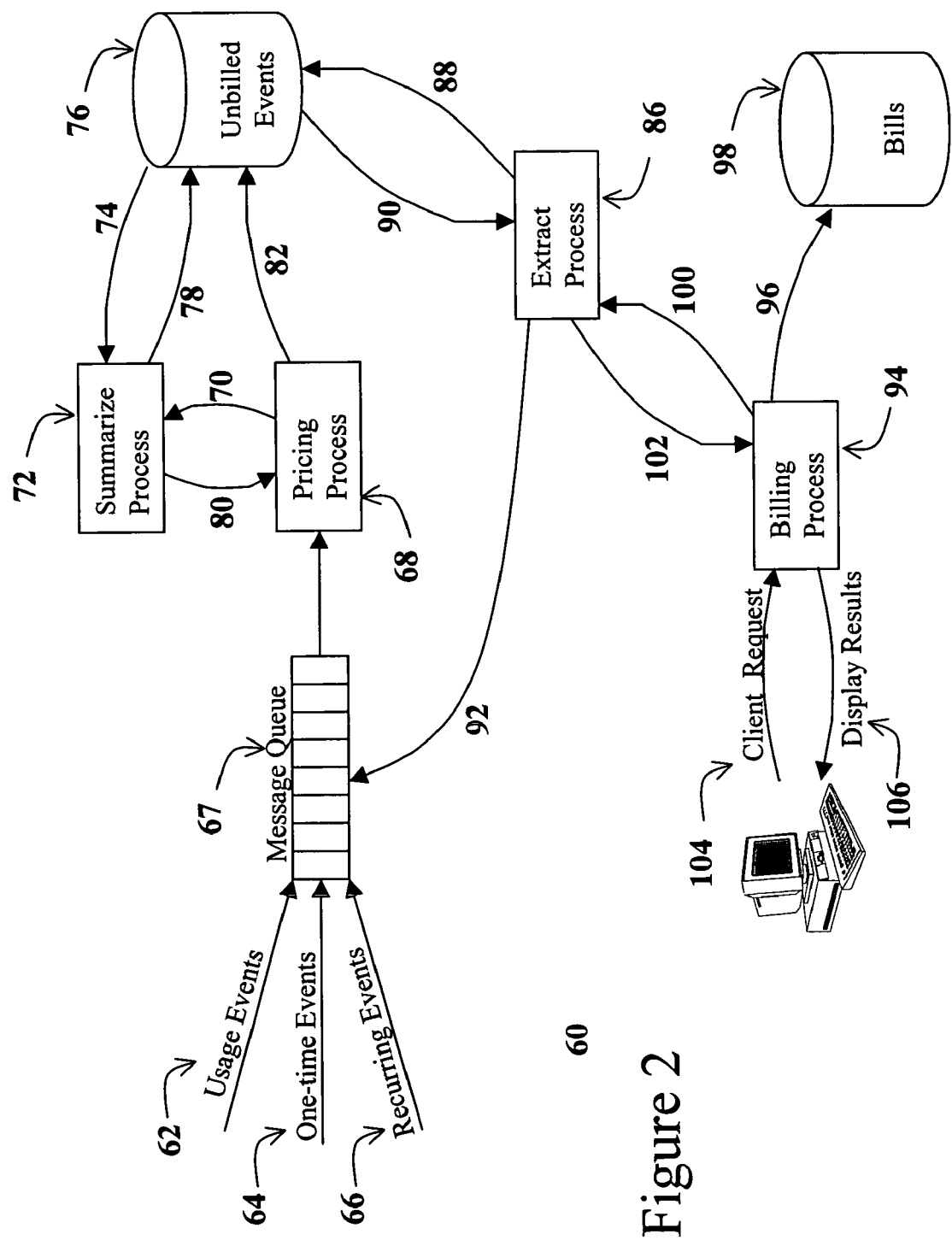
FIG. 2 is a process and data flow diagram highlighting the pricing and billing processes performed by the present invention.

As discussed earlier, there are three basic types of events. Referring to the operation and data flow 60 diagram in FIG. 2, they are usage 62, one-time 64, and recurring 66. Events are generated from a variety of places inside and outside the system. Usage events 62 are generated by the customer while using a subscribed service, and generally come from a telecommunications network. Usage events are priceable immediately after they are received by the system. One-time events 64 can be generated by the system or received by the system. Examples of one-time events 64 created by the system are fees resulting from the activation or cancellation of a subscription, and an example of a one-time event 64 received by the system is an event created by the network to capture the information for operator assistance on a long distance call. One-time events 64 are priceable immediately after they are received or created by the system. Recurring events 66 can be created by the system or received by the system. Examples of system-created recurring events are, as discussed previously, charges that are billed on a regular, recurring interval. An example of a recurring event 66 that is received by the system is an event created by the network to capture configuration information entered by a customer via a touch tone phone. Recurring events 66 are priceable immediately after they are received or created by the system.

Regardless of where or when events are generated, they eventually must go through a pricing process for the system to be able to bill them to a customer. The approach of the present invention is to final price events in real-time (as soon as they are received) using a pricing process 68 that runs continuously.

As an event is received into the system or created by the system, it is immediately placed into the message queue 67 of a pricing process 68. During processing, the pricing process 68 checks to see if the event applies to any price plans that require a summary. If the event applies to a summary, then it is forwarded 70 to a summarize process 72. The summarize process 72 creates/maintains summaries in real-time (i.e., real-time summarization). The summarize process 72 first attempts to retrieve 74 an existing, applicable summary, from the unbilled events database 76, to which the charge can be added. If an applicable summary exists, it is updated 78. If an applicable summary does not exist, then a new summary is created and stored 78 in the unbilled events database 76. The summary record, if necessary, is also returned 80 to the pricing process 68 and evaluated as part of the price plan. The pricing process 68 final prices the event and stores 82 it in the unbilled events database 76 for future reference and billing. The real-time summarization process 72 is illustrated in more detail as a flow in the inset of FIG. 6.

If desired, the pricing process 68 is also capable of pricing impacted summary records each time they are updated, although the embodiment discussed herein does not price summary events until they are extracted for display, either to a CSR, a customer, or for a bill.

All events are stored in the unbilled events 76 database until they are billed by the billing process 94. Since the processes to generate bills and to display unbilled events to a CSR or customer are similar, the billing process 94 is used for both of these features. When a CSR or customer requests to view the charges that will appear on the customer's next bill, the application server receives a request 104 from the client for the billing process 94. The billing process 94 then issues a request 100 to the extract process 86 for the customers unbilled events, which first extracts 90 the applicable unbilled summary events from the unbilled events 76 database. When all applicable unbilled summary events have been extracted 90, the extract process 86 then determines if any of the summary events need to be priced. If so, then those summary events are inserted 92 into the message queue 67 for the pricing process 68 and priced immediately. When all the summaries have been priced, the extract process 86 then extracts 90 all applicable unbilled events and delivers 102 the unbilled events to the billing process 94 for formatting. Once the billing process 94 has formatted the unbilled events, the information is returned 106 to the client for display.

The process flow for creating a bill is the same as displaying unbilled events with the following exceptions: the extract process 86 also marks 88 the unbilled events 76 as billed, which results in the migration of those events from the unbilled events 76 database to another database, such as a billed events database, the billing process 94 is initiated based on time (not shown) rather than a client request 104, and the formatted events are forwarded 96 to the bills 98 database rather than returning 106 them to the client. The billing process 94 and extract process 86 are illustrated in more detail in FIG. 7.

Recurring events can be created by the system (one-time and usage events are delivered to the system). In addition to creating recurring events, the system also creates minimum charge summary and maximum charge summary events. This is done to preserve the intent of the invention by making all known charges available for contribution to pricing plans and for display, either to a CSR, a customer, or on a bill, at any point in time.

The present invention creates recurring, minimum charge summary, and maximum charge summary events when the schedule determined by the subscription dictates it. As described earlier, once these events are available to the system, they are placed in the message queues of a pricing process for immediate pricing and summarization.

Recurring, minimum, and maximum charges are calculated in traditional systems when the pricing process is performed during the billing process. This is the latest possible moment in which to calculate charges to be billed by the current billing process. This traditional approach may provide the advantage of pricing each charge only once since everything (e.g., cancellation date, suspension date, price plan change date, etc.) necessary to calculate accurate charges is known, however, there are several disadvantages. The disadvantages of such a traditional approach are:

- the billing process is burdened with the overhead of the pricing process which performs a significant number of calculations to create recurring, minimum, and maximum charges, which are repetitive, predictable, and could have been performed earlier;
- the charges are not available for inquiry until the billing process has completed, so anyone viewing the charges for a customer prior to billing may not know that a recurring, minimum, or maximum charge applies or what the charge is;
- the creation of the charges is linked to the billing process in which the bill is produced, thereby placing an unnecessary restriction on the system; and
- the charges are not available to be applied to summaries for discount plans in the same manner as other events that are processed throughout the period, so customers are not given timely credit for these charges in summaries for discount plans.

Figure 3:
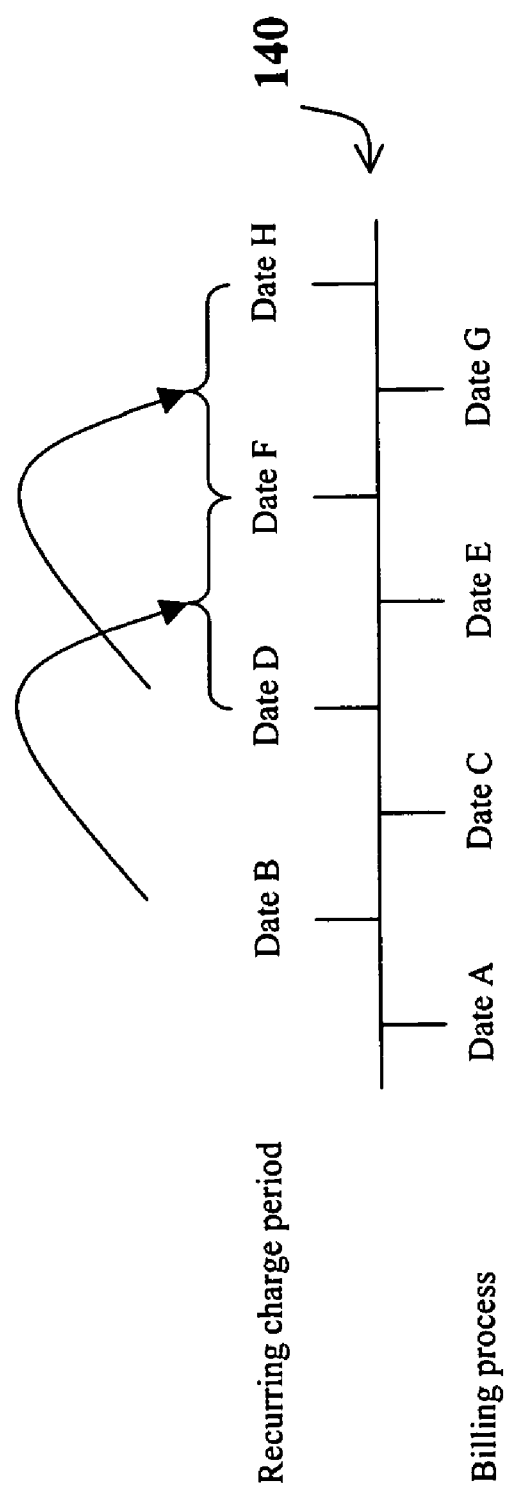
FIG. 3 illustrates a recurring event creation and billing process time line for monthly recurring charges and a monthly billing process.
Figure 4:
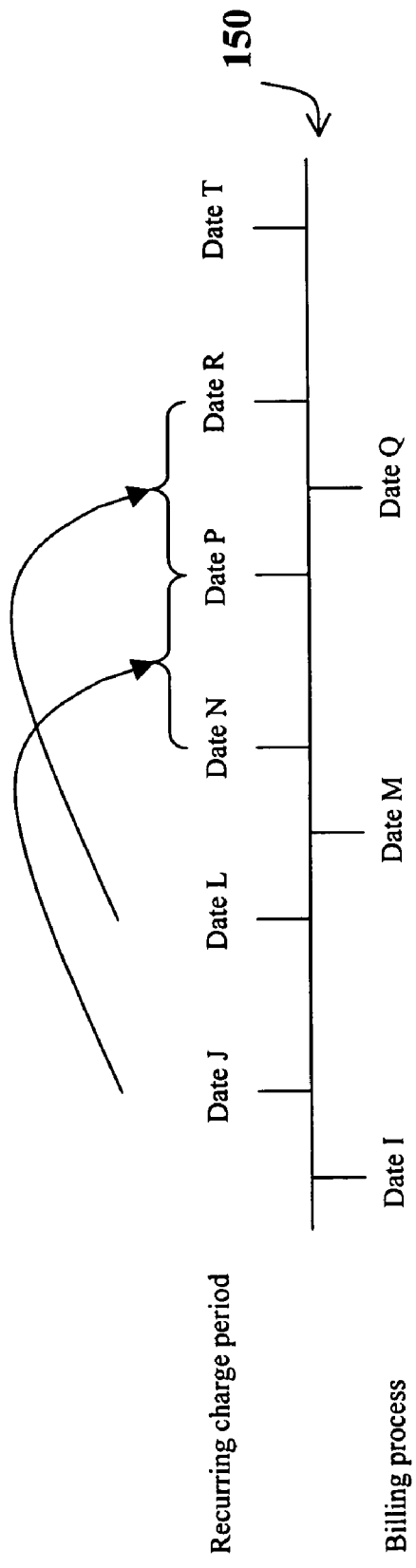
FIG. 4 illustrates a recurring event creation and billing process time line for monthly recurring charges and a bi-monthly billing process.

The present invention creates recurring, minimum charge summary, and maximum charge summary events based on a schedule defined by the customer's subscription which is stored on the database server. The schedule is independent of the billing process and allows for events to be created and priced independent of the billing process. In this way, the invention fully supports the traditional approach of creating recurring events whose frequency is equal to that of the billing period, as is illustrated in FIG. 3, as well as supporting creating recurring events where the frequency of the recurring charge period is different than the frequency of the billing period, as is illustrated in FIG. 4. Note that FIG. 4 illustrates an example where the recurring charge period (monthly) is more frequent than the billing period (bi-monthly), but an equally valid example (not shown), which is also fully supported by the invention, is one where the recurring charge period is longer (e.g., bi-monthly or quarterly) than the billing period (e.g., monthly).

Figure 8:
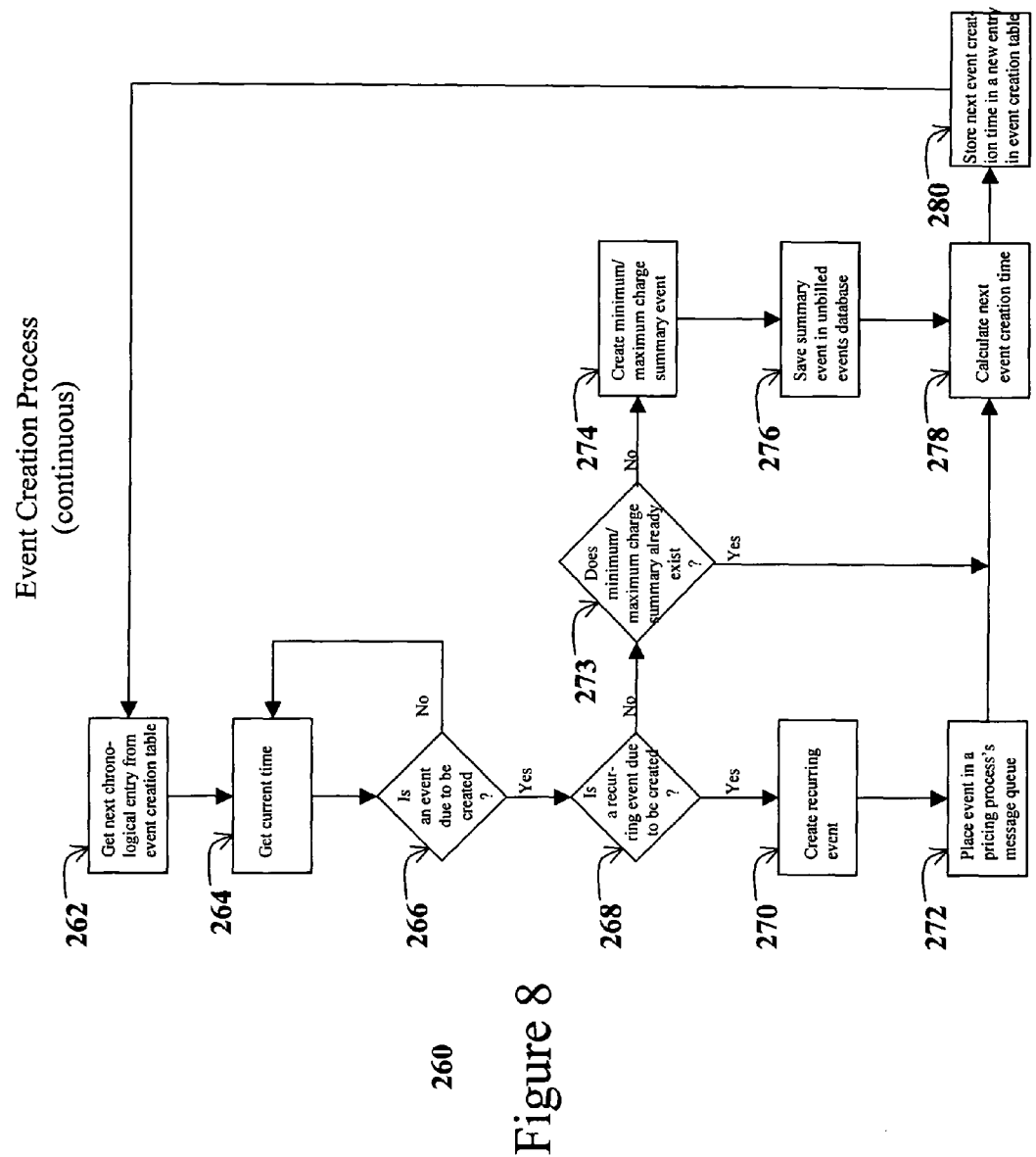
FIG. 8 is a block diagram of the event creation process performed by the present invention.

The event creation process in FIG. 8 illustrates how this is accomplished, again by utilizing a continuously running process, which identifies the system-created events due to be created. When an event is created, it is placed in the message queue of a pricing process for immediate pricing and summarization.

The present invention uses attributes of the subscription such as period frequency (monthly, quarterly, etc.), period start date, and billed through date to dictate when system-created events are to be created. Refer to the time line 140 in FIG. 3 to help illustrate an example where the period frequency for a recurring charge is the same as that of the billing period. Dates A, C, E and G represent days when the billing process runs. Dates B, D, F and H mark the first days of the recurring charge period.

Recurring charges are typically billed in advance. For example, on bill Date C, the recurring charge that covers the period beginning on Date D and ending one day before Date F is billed.

A traditional implementation would calculate the recurring charge that covers the period beginning on Date D in the pricing process performed during the billing process on Date C. This includes at a minimum a process that identifies the recurring charges that must be billed, and determines the period to be billed and the amount to be billed.

The approach of the present invention is to examine all the information required to create the recurring event and price it outside of the billing process. The same edits and calculations performed for the traditional approach must still be performed, but the invention's approach is to perform them in event and pricing processes independent of when the billing process is performed. For example, when Date B arrives (Date A<Date B<=Date C), the recurring event for the period beginning with Date D is created, and the charge is immediately calculated and applied to any applicable summaries. This charge is immediately available in the system, and can be viewed by a CSR or a customer. More importantly, the charge is also available when the billing process on Date C commences, so the billing process does not have to wait for the event creation and pricing processes as is the case for a traditional implementation. Similarly, the recurring event for the period beginning with Date F is created, and the charge calculated, on Date D (Date C<Date D<=Date E).

While the approach of the invention for creating system-created charges is completely flexible, the preferred and optimal implementation of this is to define the schedule in such a way that recurring, minimum charge summary, and maximum charge summary events to be billed during the next billing process are created as soon as practical after the previous billing process has completed (i.e., on Date D remains after Date C, but is probably the following day and optimally, that night). The event creation process of the present invention includes the ability to specify a time, in addition to a date, when to create a system-created event.

To illustrate the flexibility of the present invention, refer to the time line 150 in FIG. 4 to help illustrate an example where the period frequency for a recurring charge is different than that of the billing period. In this example, the recurring events are still created and priced on a monthly basis, but the billing process is run bi-monthly. Dates I, M, and Q represent days when the billing process runs. Dates J, L, N, P, R, and T mark the first days of the recurring charge periods.

To preserve the industry standard of billing recurring charges in advance, in this example recurring events are created to cover a period two months in advance, rather than one month in advance, so that the customer is billed sufficiently to cover recurring charges at least until the next billing process is run. For example, on bill Date M, the recurring charges that cover the one-month periods beginning on Date N and Date P are billed.

As described before, even if a traditional implementation is sophisticated enough to support billing periods that differ from recurring charge periods, the recurring charges covering the periods beginning on Date N and Date P would be calculated in the pricing process performed during the billing process on Date M. This includes at a minimum a process that identifies the recurring charges that must be billed, and determines the periods to be billed and the amounts to be billed.

Again, the approach of the present invention is to examine all the information required to create the recurring event and price it outside of the billing process. The same edits and calculations performed for the traditional approach must still be performed, but the invention's approach is to perform them in event creation and pricing processes independent of when the billing process is performed. For example, when Date J arrives (Date I<Date J<Date L), the recurring event for the period beginning with Date N is created, and the charge is immediately calculated. This charge is immediately available in the system, and can be viewed by a CSR or a customer. Similarly, on Date L (Date J<Date L<=Date M), the recurring event for the period beginning with Date P is created, and the charge calculated. Both of the recurring events and their charges are also available when the billing process on Date M commences, so the billing process does not have to wait for the event creation and pricing processes as described for a traditional implementation.

Creating system-created events and pricing them independent of the billing process also makes the charges for those events available to be applied to summaries for discount plans in the same manner as other events that are processed throughout the period, such as usage and one-time events. This means charges for system-created events can be applied to discount summaries, and customers are given timely credit for those charges towards their discount plans. This is most visible when a CSR or customer makes a request to view the customer's unbilled charges. By applying the charges for system-created events to applicable summaries, a complete and accurate picture of discounts earned can be displayed for the CSR or customer along with the unbilled charges.

Figure 5:
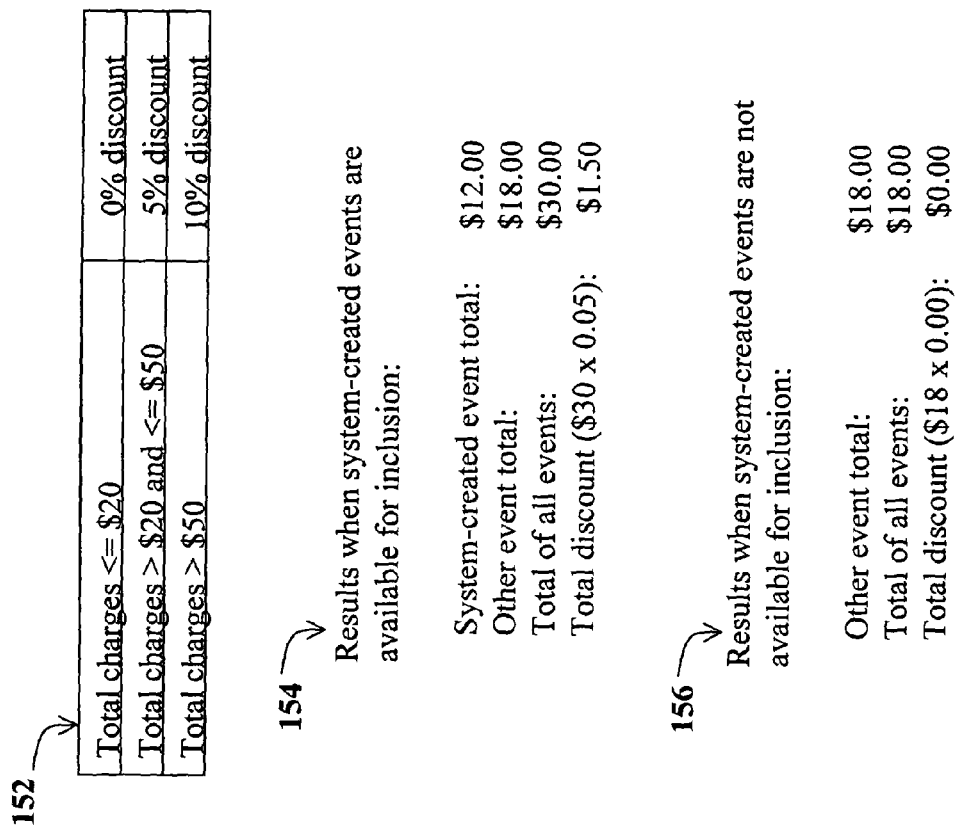
FIG. 5 is an example of a tiered pricing plan with examples that illustrate the impact of having system-created events available for the summaries of pricing plans.

For example, consider the example in FIG. 5 that defines the discounting parameters for a simple tiered pricing plan, which offers a single lump discount based on the sum of all charges for applicable events. Referring to table 152, if the total of applicable charges is less than or equal to $20, then no discount has been earned. If the sum of all applicable charges is greater than $20 and less than or equal to $50, the total sum of charges would have earned at least a 5% discount. And, if the sum of all applicable charges is more than $50, a discount of 10% is awarded when the summary is billed. Consider an example where a customer is responsible for $12 of recurring charges in a billing period, in addition to their accumulated usage charges, which are, for example, $18 on a particular day. That same day, when a CSR or customer views the customer's unbilled charges they will see that the recurring charges are included 154 in the calculation of the discount and that the customer has already earned at least $1.50 discount. The flexible architecture of the present invention supports accomplishing this in several ways. The present invention preferably prices a summary event, i.e., in this case to calculate the current discount earned by a summary of all contributing events, only when the summary event is to be displayed (for a CSR, customer, or on a bill). However, the architecture of the present invention also supports pricing summary events each time the summary event is updated, so that pricing activities for summary events are not required at display time, and the architecture of the present invention also supports real-time re-processing of each impacted contributing event, so that the corresponding discount earned by each contributing event is maintained on the event itself rather than just on a discount summary event. A less sophisticated system that does not create system-created events independent of the billing cycle would not have the opportunity to include the recurring charges in the discount summary, and therefore any display of unbilled charges would not show 156 that a discount had been earned. The method of the invention provides a complete and accurate representation of unbilled charges to date, while a less sophisticated system provides incomplete and inaccurate information.

The advantages of creating system-created events independent of the billing process, and performing a pricing process that calculates charges for recurring events, minimum charge summary events, and maximum charge summary events independent of the billing process are:

the overhead of the event creation and pricing processes, which perform a significant number of calculations to calculate charges for events, no longer impacts the billing process;

complete and accurate events with charges are available to the billing process, and available for customer inquiry, immediately after the events are created and before the billing process runs;

the events are created, and charges calculated, independent of the billing process, which enables subscriptions to be defined using frequencies (i.e., monthly, quarterly) that are independent of the customer's billing frequency; and the charges are available to be applied to summaries for discount plans in the same manner as other events that are processed throughout the period, so customers are given timely credit for charges in summaries for discount plans.

For the system to maintain priced unbilled events, the system needs to be able to identify and act on changing information that impacts the charges for unbilled events. The present invention also captures changes in the system that affect unbilled events, including summary events, and then re-calculates the charges for those events.

For example, referring again to FIG. 3, as explained above, the recurring event for the period beginning on Date D is created, and the charge calculated, on Date B. Given this, there are several possible scenarios that can impact this recurring event, three of which are illustrated below as examples:

If the customer calls before Date C (and after Date B) to terminate the service represented in FIG. 3 on Date E, then this information is captured and used to identify any events that may have been impacted. The potentially impacted events are marked for re-processing, and inserted in a message queue of a pricing process. In this example, the pricing process will delete the recurring event created on Date B, create a new recurring event, and calculate its charge, for the period from Date D to Date E.

If the customer calls before Date C (and after Date B) to terminate the service on Date C, then this information is captured and used to identify any events that may have been impacted. The potentially impacted events are marked for re-processing, and inserted in a message queue of a pricing process. In this example, the pricing process will delete the recurring event created on date B, and calculate a credit for the period from date C to date D (as the recurring period from date B to date D was already billed as part of the billing process of date A).

If the customer calls before Date C (and after Date B) to terminate the service on Date G, then this information is captured and used to identify any events that may have been impacted. The potentially impacted events are marked for re-processing, and inserted in a message queue of a pricing process. In this example, the pricing process will do nothing to the recurring event for the period beginning on Date D, because the full period is still billable. On Date D, when the subsequent recurring event is created and the charge is calculated, the termination of service on Date G will be taken into account and a final, partial recurring charge from Date F to Date G will be calculated.

The pricing process 160 resides in an idle state 162 until a message exists or appears in the message queue at which point the idle state 162 is exited and the message is read 164. A determination is made 166 as to whether the message refers to an event file and if so an event is read 168 from the file. Then the system checks 170 to see if the end of the file has been reached. If so, the system returns to the idle state 162. Otherwise, the system identifies 172 the subscription for the event and identifies 174 the price plan for the event. Control is then passed to a real time summarization process 176 to be discussed later. After the summarization process 176 is complete the event is priced 178 and saved 182. The system then determines 182 whether the event came from a file and, if so, returns to reading events 168.

In the summarization process 176, a check 184 is made to determine whether a summary applies to the price plan. If so, the system checks 186 to see if a summary already exists by looking in the unbilled events database. If a summary does not exist, a summary is created 188 and saved 190. If a summary does exist, a determination 192 is made as to whether the event is being reprocessed and, if not, the summary is updated 194 and saved 190. If the event is being reprocessed, then the impact of the original event is essentially erased 196 from the summary before the summary is updated 194 using the new charge for the event and saved 190.

Figure 7:
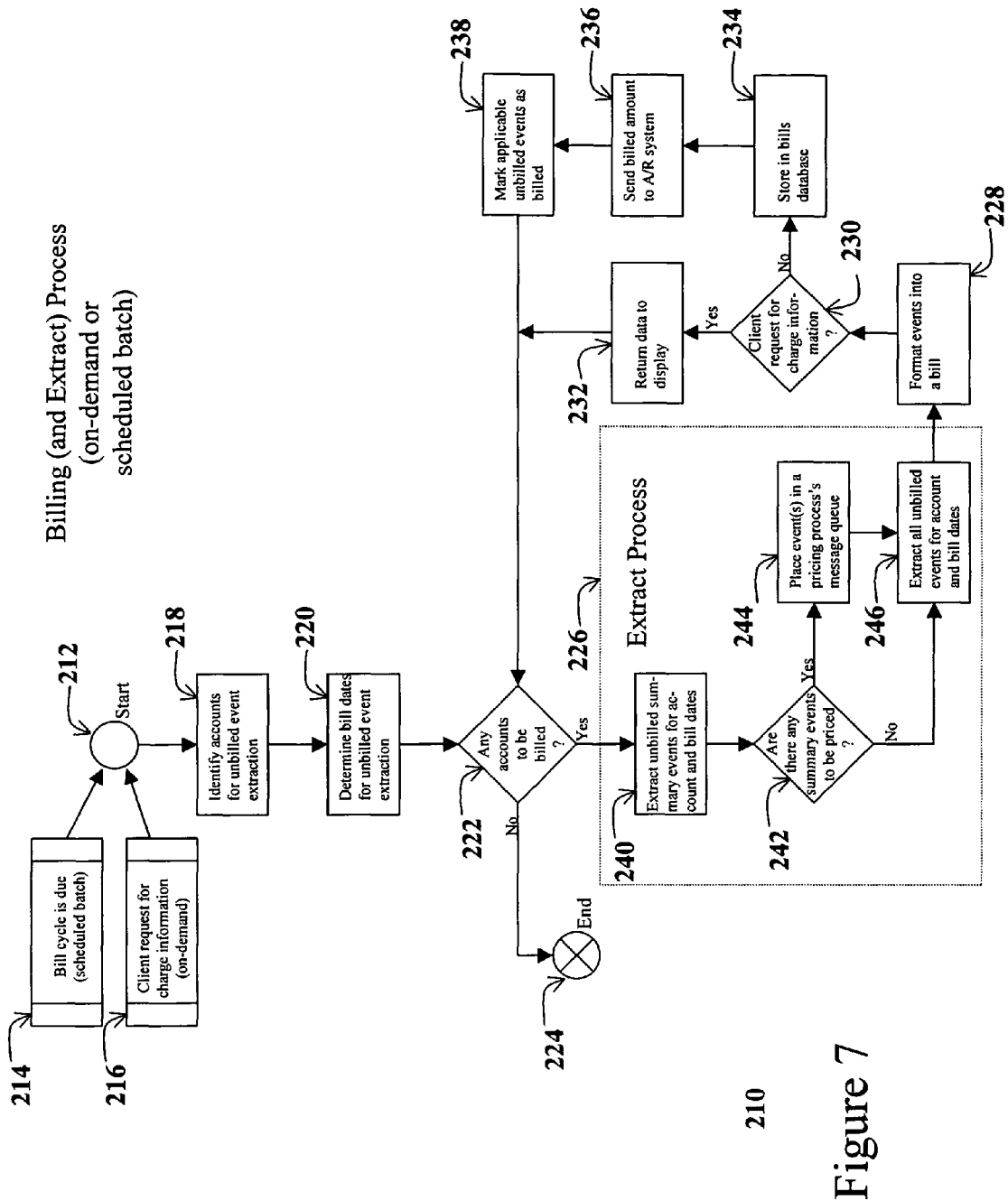
FIG. 7 is a block diagram of the billing and extract processes.

A billing process 210, as shown in FIG. 7, starts 212 when a bill cycle is due 214 or when an on-demand request occurs 216. The accounts to be billed are identified 218 and the dates that govern the extraction are identified 220. The system then checks 222 to see if any accounts were identified to be billed and, if not, stops 224. Otherwise, an extraction process 226 discussed later is performed. Once the events are extracted, they are formatted 228. The system then determines 230 whether there has been an on-demand request for charge information by the client and, if so, the data is returned 232 to the client for display. Otherwise, the system stores 234 the bills in the database, sends 236 the billed amounts to an accounts receivable system and the events are marked 238 as billed to prevent extraction during the subsequent billing process for this account. The system then checks 222 to see if there are still more accounts to be billed and, if not, stops 224.

In the extract process 226 the system extracts 240 the unbilled summary events according to the extract dates and current account filter and determines 242 whether the summary events need to be priced. If so, the summary events needing pricing are sent 244 to a pricing process. After any summary events requiring pricing have been priced, all unbilled events according to the extract dates and the current account 246 are extracted and returned to the billing process for formatting 228.

The event creation process 260, as depicted in FIG. 8 and described in more detail in the Appendix, is essentially a continuously executing process that obtains 262 a future-dated chronologically ordered entry from an event creation table. The current date and time is obtained 264 and compared 266 to the date of the entry from the table. If the current date and time is after the date of the entry from the table, the system checks 268 to see if a recurring event is to be created. If so, the recurring event is created 270 and placed 272 in a pricing process queue. Otherwise, a minimum/maximum charge event summary is due to be created. The system checks 273 to see whether the minimum/maximum charge summary event to be created has not already been created (as a result of the normal pricing and real-time summarization processing described for FIG. 6) and, if not, the minimum/maximum charge summary event is created 274 and placed 276 in the unbilled events database. After the appropriate event is created or verified to already exist, the next event creation time is calculated 278 by the system and stored 280 as a new entry in the table.

The many features and advantages of the invention are apparent from the detailed specification and, thus, it is intended by the appended claims to cover all such features and advantages of the invention which fall within the true spirit and scope of the invention. Further, since numerous variations, modifications and changes will be readily identifiable or occur to those skilled in the art, it is not desired to limit the invention to the exact construction and operation illustrated and described, and accordingly, all suitable modifications and equivalents may be resorted to falling within the scope of the invention.

The present invention has been described with respect to a preferred software and hardware architecture but the invention can be implemented in a number of different architectures. Also, the present invention is not limited to the telecommunications industry. The present invention can be applied to any other industry that requires a high throughput of priced information, such as an insurance claims processing system, for example. The present invention can also be used in such activities as pro-rating recurring charges or estimating usage charges through the end of the period when an implementation requires such activities to display information to a user. The present invention, as described herein, also frequently refers to recurring, minimum charge summary, and maximum charge summary events as system-created events. These types of events were selected for their simplicity, and should not be considered a comprehensive list of system-created events. For example, the event creation process 260 described in FIG. 8 can easily be expanded to include other types of system-created events.

What is claimed is:

1. An event pricing system, comprising:
   at least one computer having:
   a continuously running event creation process determining whether a system initiated and created non-usage event independent of user initiated events is due to be created and creating the non-usage event; and
   a continuously running pricing process pricing the system-created non-usage events and non-system-created events as they become available to the system, where the pricing process includes pricing the system-created non-usage events and/or the non-system-created events independent of a billing process.

2. A system as recited in claim 1, wherein all events are priced as they become available to the system.

3. A system as recited in claim 1, wherein all system-created events are created at any time based on a flexible schedule independent of a billing process.

4. A system as recited in claim 3, wherein system initiated and created events for a customer may be created in one of less frequently than the customer is billed, as frequently as the customer is billed and more frequently than the customer is billed.

5. A system as recited in claim 1, wherein summary events are created and maintained in real-time as events are priced.

6. A system as recited in claim 1, wherein all events are available for contribution to summary records for discounting and consolidation.

7. A system as recited in claim 1, wherein charges for all events that are relevant to a billing period are calculated and available in the system at the earliest practical time.

8. A system as recited in claim 1, wherein processing for calculating charges to be billed in a current billing period is outside the billing process.

9. A system as recited in claim 1, wherein charges for all unbilled events are ready for the billing process and ready for display on-demand.

10. A system as recited in claim 1, wherein said pricing process performs real-time recalculation of a charge for any unbilled event when information in the system which impact the charge has changed.

11. A computer implemented event pricing process, comprising:
    determining, by a computer, whether a system initiated and created non-usage event independent of user initiated events is priceable; and
    pricing, by the computer, the non-usage event responsive to the determining, where the pricing includes pricing the non-usage event independent of a billing process that includes a non-system-created event.

12. A process as recited in claim 11, wherein priceable events are priced immediately.

13. A process as recited in claim 11, wherein all charge events are priced in real-time.

14. A computer implemented event pricing process, comprising:
    determining, by a computer, whether an event is priceable; and
    pricing, by the computer, the event responsive to the determining, wherein all available system initiated and created non-usage events independent of user initiated events for a current billing period are priced at a first opportunity after a prior billing period that includes non-system-created events ends.

15. A process as recited in claim 11, wherein a usage event is priced at a time that the usage occurs.

16. A process as recited in claim 11, wherein a recurring charge is calculated after an end of a prior billing period and before the billing date for the recurring charge.

17. A process as recited in claim 11, wherein a minimum or a maximum charge is calculated and captured in a summary after an end of a prior billing period and before the billing date for the recurring charge.

18. A process as recited in claim 11, wherein charges for summary events are calculated on-demand at a time of charge display.

19. A computer implemented event pricing process, comprising:
    determining, by a computer, whether a system initiated and created non-usage event independent of user initiated events is due to be created; and
    creating, by the computer, the non-usage event responsive to the determining; and
    pricing, by the computer, the non-usage event responsive to the creating, where the pricing includes pricing the non-usage event independent of a billing process that includes a non-system-created event.

20. A process as recited in claim 19, wherein system initiated and created events are created independent of other processes.

21. A process as recited in claim 19, wherein system initiated and created events are created according to a schedule in the system.

22. A process as recited in claim 21, wherein said schedule is created and maintained by the system based on subscription information available in the system.

23. A process as recited in claim 19, wherein a recurring event is created after an end of a prior billing period and before the billing date for the recurring charge.

24. A process as recited in claim 19, wherein minimum and maximum charge summary events are created after an end of a prior billing period and before the billing date for the recurring charge.

25. An event pricing system, comprising:
    a computer having:
    a continuously running event creation process determining whether a system initiated and created non-usage event independent of user initiated events has become current; and
    a continuously running pricing process pricing the system-created non-usage events and non-system-created events as they become available to the system, and creating and maintaining summary events in real-time as events are priced, where the pricing process includes pricing the system-created non-usage events and/or the non-system-created events independent of a billing process.

26. An event pricing system, comprising:
    a computer having:
    a continuously running event creation process determining whether a system initiated and created non-usage event independent of user initiated events is due to be created and creating system-created non-usage events at any time based on a flexible schedule; and
    a continuously running pricing process, independent of a billing process, pricing of the system-created, non-usage and non-system-created events as ready for the billing process and for display as they become available to the system with all events priced as they become available to the system and creating summary events as events are being priced and performing real-time recalculation of a charge for any unbilled event when information in the system which impacts charge has changed.

27. An event pricing apparatus, comprising:
    a source of system initiated and created non-usage events independent of user initiated events; and
    a processor pricing the non-usage events when the events are priceable, where the pricing includes pricing the non-usage event independent of a billing process that includes the user initiated events.

28. A computer readable storage medium including an event pricing process controlling a computer and having a continuously running event creation process determining whether a system initiated and created non-usage event independent of user initiated events is due to be created, and a continuously running pricing process pricing the system-created non-usage events and non-system-created events as they become available to the system, where the pricing process includes pricing the system-created non-usage events and/or the non-system-created events independent of a billing process.

29. A system providing pricing information for on-demand billing for events, comprising:
- a message queue receiving events including system initiated and created non-usage events and usage events; and
- a processor performing a pricing process where non-usage and usage events independent of user initiated events are continuously delivered to the pricing process via the message queue and priced as they become available independent of a billing process.

30. A continuous pricing process for an event-driven system, comprising;
- storing events in a message queue, the events being system initiated and created non-usage events, usage events, one time events, and summary events;
- delivering the events in the message queue to a pricing process as they become available, the delivered events including events independent of user initiated events; and
- pricing the events, the pricing including pricing the non-usage events independent of a billing process that includes the user initiated events.

31. An event pricing system, comprising:
at least one computer having:
- a continuously running event creation process determining whether a system initiated and created non-usage event independent of user initiated events is due to be created and creating the non-usage event when due;
- a continuously running pricing process pricing the system-created non-usage events and non-system-created events including usage events as they become available to the system producing priced events, the pricing process including pricing the system-created non-usage events and/or the non-system-created events independent of a billing process; and
- an intermittently running billing process running responsive to bill cycles and customer on demand billing information requests and producing a bill using the priced events.

32. An event pricing process using a computer, comprising:
receiving system initiated and created non-usage events independent of user initiated events; and
pricing, by the computer, the system initiated and created non-usage events as soon as the events are received, where the pricing includes pricing the non-usage events independent of a billing process that includes the user initiated events.

33. A method for a continuous real-time calculation of a bill using a computer, comprising:
- executing the real-time calculation of the bill each time an event independent of a user's initiation occurs, the processing of the real-time calculation of the bill being independent of a billing process having an event responsive to the user's initiation; and
- continuously reflecting the event independent of the user's initiation on the bill and maintaining a summary total for the bill, where the bill including the event independent of the user's initiation is displayed to the user on-demand and/or is provided to the user in accordance with the billing process.

* * * * *